(12) United States Patent
Okamoto

(10) Patent No.: US 11,496,688 B2
(45) Date of Patent: Nov. 8, 2022

(54) IMAGE CAPTURING APPARATUS, CONTROL METHOD OF IMAGE CAPTURING APPARATUS WHICH DETERMINES CHARGE ACCUMULATION TIME BASED ON HISTOGRAM OF A PIXEL VALUE FOR EACH AREA

(71) Applicant: CANON KABUSHIKI KAISHA, Tokyo (JP)

(72) Inventor: Satoshi Okamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/096,798

(22) Filed: Nov. 12, 2020

(65) Prior Publication Data

US 2021/0152721 A1    May 20, 2021

(30) Foreign Application Priority Data

Nov. 18, 2019    (JP) .............................. JP2019-207912

(51) Int. Cl.
*H04N 5/235*      (2006.01)
(52) U.S. Cl.
CPC ......... *H04N 5/2352* (2013.01); *H04N 5/2351* (2013.01); *H04N 5/2355* (2013.01)

(58) Field of Classification Search
CPC .. H04N 5/2352; H04N 5/2351; H04N 5/2355; H04N 5/2353; H04N 5/243; H04N 5/3535; H04N 5/374; H04N 5/378; H04N 5/232
See application file for complete search history.

(56) References Cited

U.S. PATENT DOCUMENTS

| | | | | |
|---|---|---|---|---|
| 2009/0002520 A1* | 1/2009 | Yoshida | ............... | H04N 5/2357 348/226.1 |
| 2011/0129149 A1* | 6/2011 | Kang | ................... | H04N 5/2351 382/168 |
| 2011/0279710 A1* | 11/2011 | Lee | ......................... | H04N 5/243 348/234 |
| 2013/0128051 A1* | 5/2013 | Velipasalar | ........ | H04N 5/23218 348/158 |
| 2018/0276783 A1* | 9/2018 | Yasuda | ............... | H04N 5/2351 |

FOREIGN PATENT DOCUMENTS

JP        5665907 B2    2/2015

* cited by examiner

*Primary Examiner* — Luong T Nguyen
(74) *Attorney, Agent, or Firm* — Canon U.S.A., Inc. IP Division

(57) ABSTRACT

An image capturing apparatus includes an image capturing unit configured to change a charge accumulation time for each area, a histogram calculation unit configured to calculate a histogram of a pixel value for the each area, an area increase/decrease unit configured to increase or decrease the number of divisions of the area based on the histogram calculated by the histogram calculation unit, and a determination unit configured to determine a charge accumulation time of the each area of which number has been increased or decreased by the area increase/decrease unit.

22 Claims, 13 Drawing Sheets

IMAGE CAPTURING APPARATUS, CONTROL METHOD OF IMAGE CAPTURING APPARATUS WHICH DETERMINES CHARGE ACCUMULATION TIME BASED ON HISTOGRAM OF A PIXEL VALUE FOR EACH AREA

BACKGROUND

Field of the Disclosure

The present invention relates to an image capturing apparatus, a control method of the image capturing apparatus, and a storage medium.

Description of the Related Art

In a case where a general network camera or an onboard camera captures an image of dark and bright areas such as near an exit of a tunnel and near an entrance of a building at the same time, blocked-up shadows or halation occurs, and only one area can be recognized in the image.

To address such issue, many techniques are discussed for expanding a dynamic range of an image capturing apparatus. For example, there is a method for capturing images having different exposure times for a plurality of times and synthesizing the images (a frame synthesis method) and a method for generating a plurality of images having different gains in one image capturing and synthesizing the images (a gain switching method). The frame synthesis method can realize a high dynamic range by increasing the number of image capturing times. However, in a case of a moving object, the moving object appears in an image as an unnatural afterimage such as a double image. On the other hand, the gain switching method is effective for a moving object since the image capturing is performed once, but is difficult to realize a high dynamic range.

Japanese Patent No. 5665907 discusses an image capturing apparatus that can change an accumulation time for each area. The image capturing apparatus can set different exposure times for a bright area and a dark area in an image and thus can obtain an image having a high dynamic range equivalent to or higher than that of the frame synthesis method. In addition, the image capturing is performed only once, so that an unnatural afterimage does not appear in the image even in the case of a moving object.

However, according to the technique discussed in Japanese Patent No. 5665907, since a level difference occurs in an image at a boundary portion of an area, the image might be unnatural. Further, as the number of areas increases, the number of boundary portions increases, so that the image tends to be more unnatural. Therefore, in a case of an image that can secure a sufficient dynamic range, it is desirable not to increase the number of areas unnecessarily.

SUMMARY OF THE DISCLOSURE

An image capturing apparatus includes an image capturing unit configured to change a charge accumulation time for each area, a histogram calculation unit configured to calculate a histogram of a pixel value for each area, an area increase/decrease unit configured to increase or decrease the number of divisions of the area based on the histogram calculated by the histogram calculation unit, and a determination unit configured to determine a charge accumulation time of each area of which number has been increased or decreased by the area increase/decrease unit.

DESCRIPTION OF THE EMBODIMENTS

Various exemplary embodiments of the present invention will be described in detail below. The exemplary embodiments described below are examples for implementing the present invention and can be appropriately modified or changed according to a configuration and various conditions of an apparatus to which the present invention is applied, so that, the present invention is not limited to the below-described exemplary embodiments.

Figure 1:
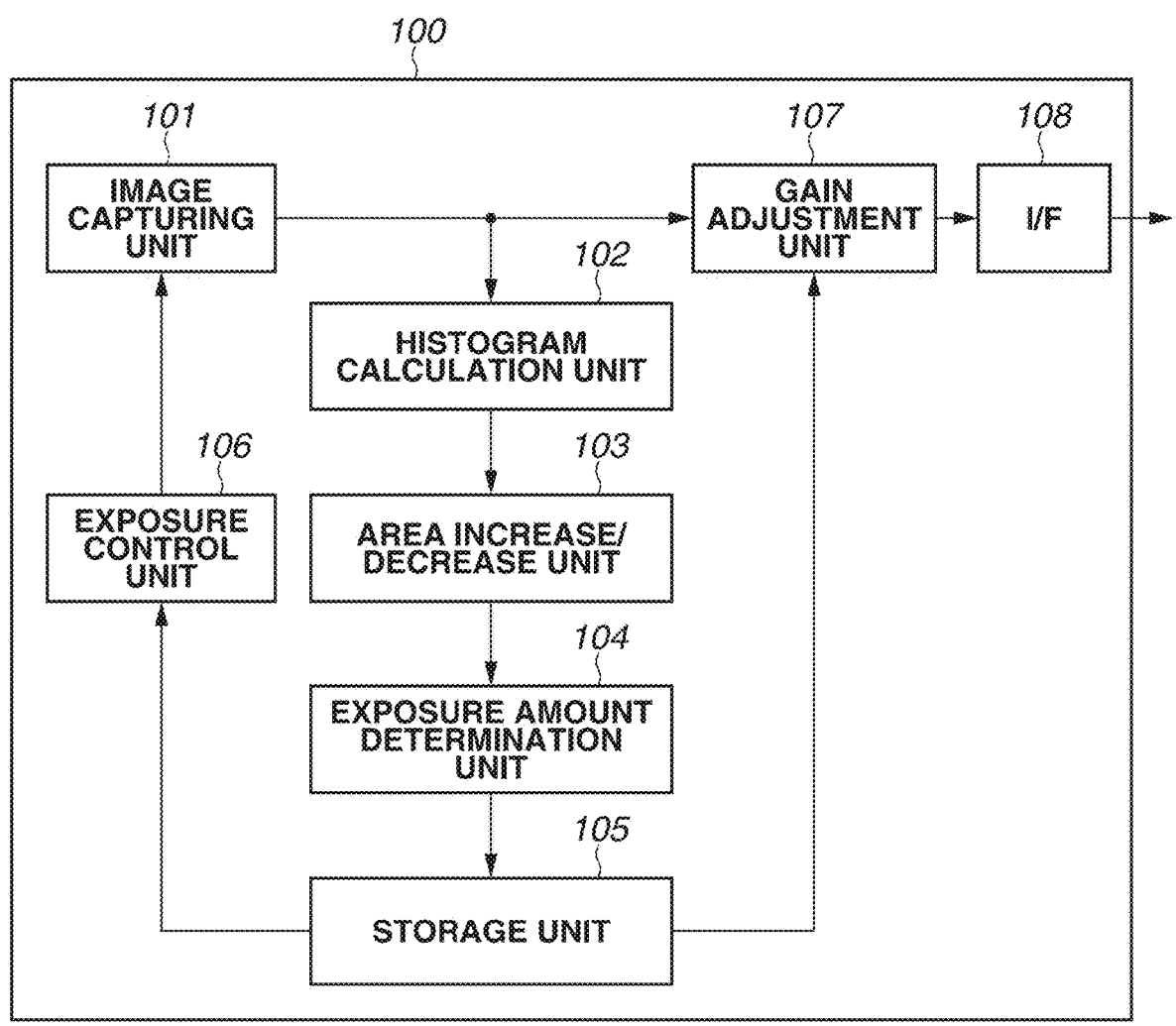
FIG. 1 is a block diagram illustrating a configuration example of an image capturing apparatus.

A configuration and a function of an image capturing apparatus 100 according to a first exemplary embodiment are described below with reference to FIG. 1. The image capturing apparatus 100 includes an image capturing unit 101, a histogram calculation unit 102, an area increase/decrease unit 103, an exposure amount determination unit 104, a storage unit 105, an exposure control unit 106, a gain adjustment unit 107, and an interface (I/F) unit 108.

The image capturing unit 101 is a complementary metal oxide semiconductor (CMOS) image sensor and includes a plurality of pixels, which store charges by photoelectrically converting light. The image capturing unit 101 can change a charge accumulation time for each area. Further, the image capturing unit 101 performs analog-to-digital conversion and outputs a digital signal of a two-dimensional image.

The histogram calculation unit 102 calculates a histogram of a pixel value for each area of the image capturing unit 101 based on a digital value output from the image capturing unit 101. The area increase/decrease unit 103 increases and decreases a number of divisions of the area of the image capturing unit 101. The exposure amount determination unit 104 determines an appropriate charge accumulation time (an exposure map) of each area of the image capturing unit 101 based on the histogram generated by the histogram calculation unit 102. The storage unit 105, which stores the exposure map determined by the exposure amount determination unit 104, is, for example, a static random access memory (SRAM). The exposure control unit 106 controls the charge accumulation time of each area determined by the exposure amount determination unit 104 with respect to the image capturing unit 101 based on the exposure map stored in the storage unit 105.

The gain adjustment unit 107 adjusts and amplifies a gain of the pixel value of each area of the image capturing unit 101 based on the exposure map stored in the storage unit 105. If the image capturing unit 101 accumulates charges at the charge accumulation times different for each area, the gain adjustment unit 107 amplifies the gain for each area, so that an exposure amount of each area becomes the same in the entire image capturing apparatus 100.

The I/F unit 108 converts the digital value output by the gain adjustment unit 107 into an electrical signal to be output to the outside of the image capturing apparatus 100. The electrical signal to be output is a low voltage differential signaling (LVDS), a Mobile Industry Processor Interface (MIPI), and the like.

Figure 2:
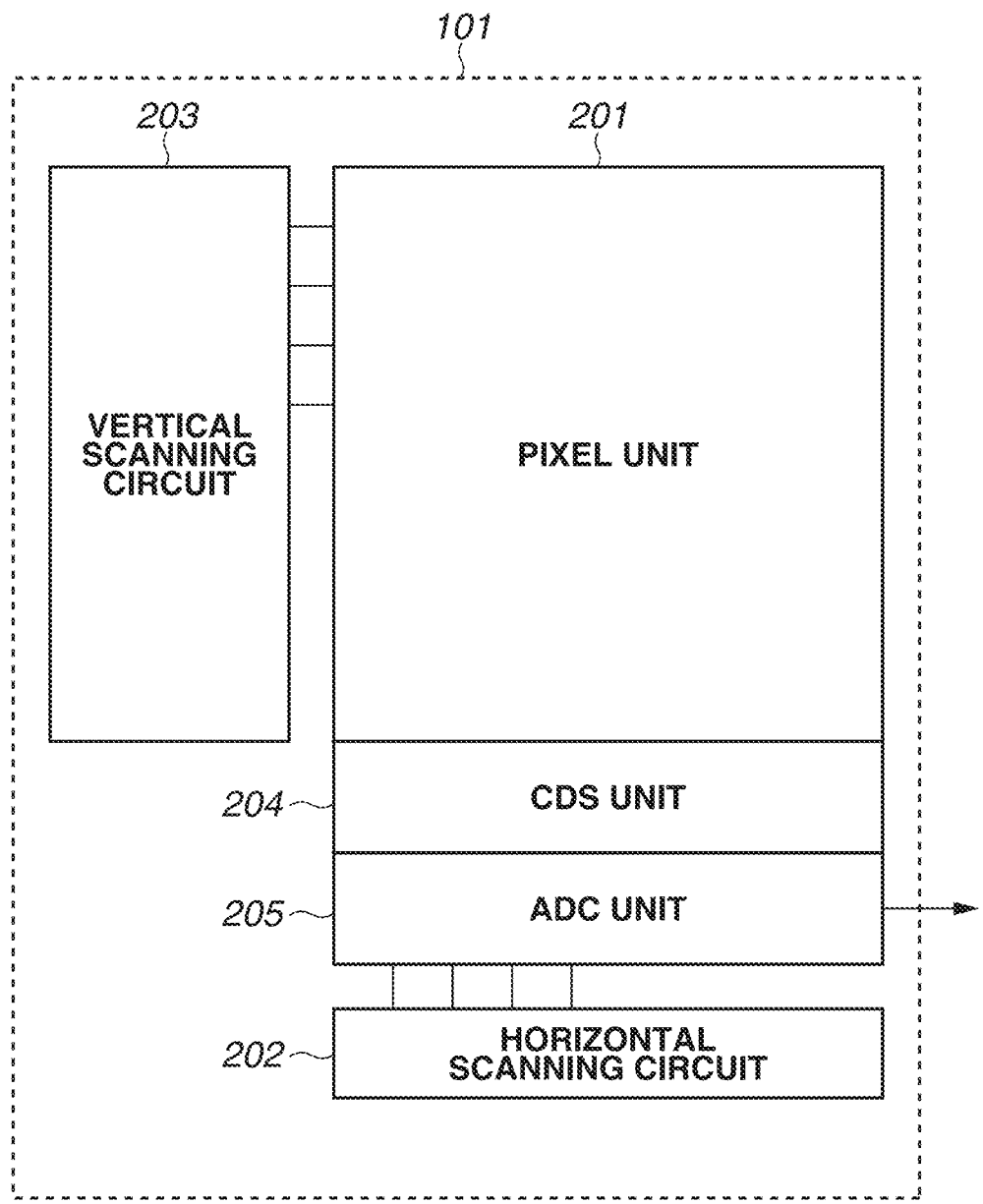
FIG. 2 is a block diagram illustrating a configuration example of an image capturing unit.

A configuration example of the image capturing unit 101 is described with reference to FIG. 2. The image capturing unit 101 includes a pixel unit 201, a horizontal scanning circuit 202, a vertical scanning circuit 203, a correlated double sampling (CDS) unit 204, and an analog-to-digital conversion (ADC) unit 205.

The pixel unit 201 in which a plurality of pixels is arranged in a matrix outputs a pixel signal to the CDS unit 204 in units of row. The vertical scanning circuit 203 sequentially selects a plurality of pixel rows in the pixel unit 201. The CDS unit 204 reduces read noise generated in a pixel by subtracting a reset level from a signal level of the pixel. The ADC unit 205 converts an analog signal output from the CDS unit 204 into a digital signal and stores the digital signal. The horizontal scanning circuit 202 sequentially selects and outputs a plurality of columns of pixel signals stored in the ADC unit 205. The order of the processing by the CDS unit 204 and the ADC unit 205 can be reversed.

Figure 3:
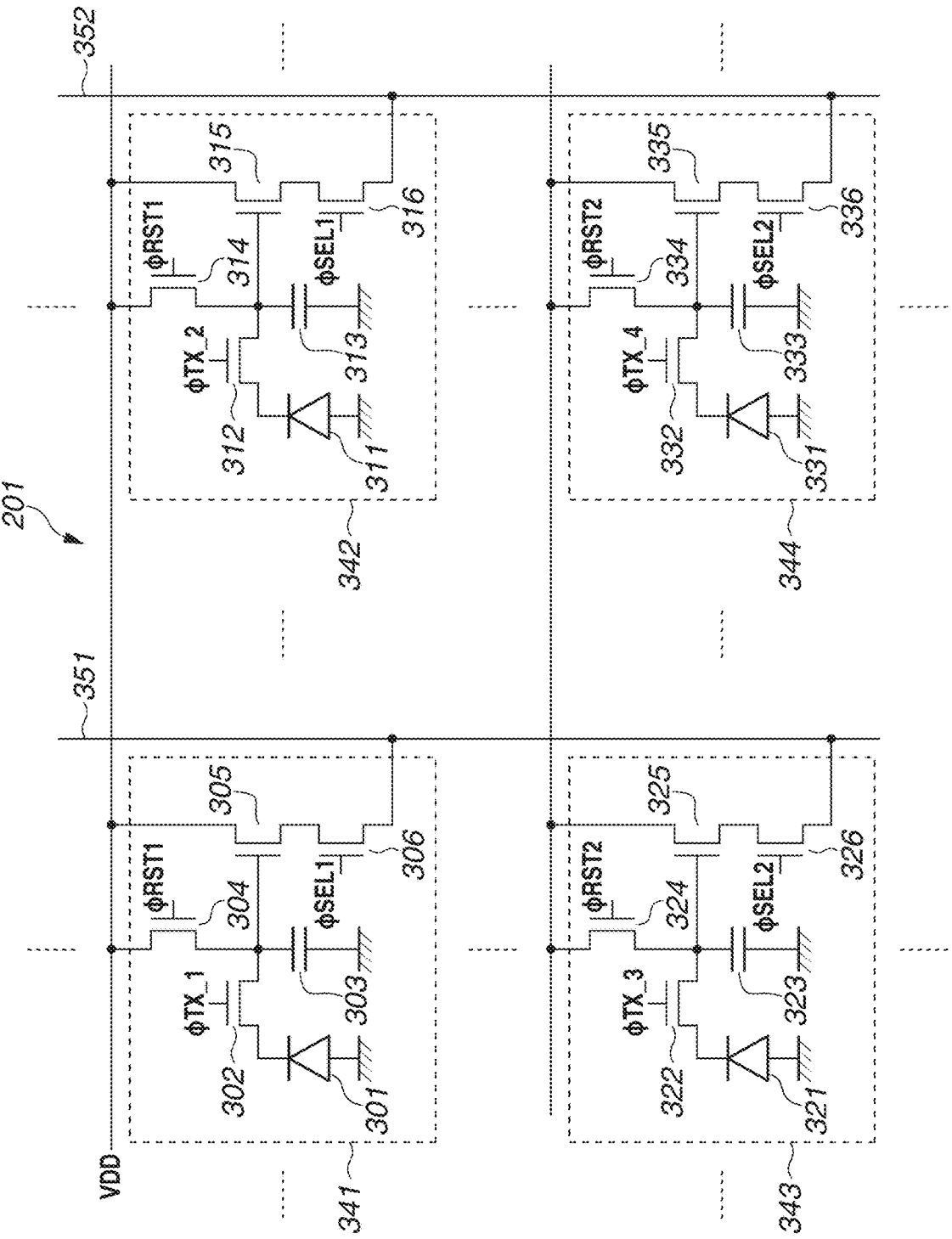
FIG. 3 is a circuit diagram illustrating a configuration example of a pixel unit.

A configuration example of the pixel unit 201 is described with reference to FIG. 3. FIG. 3 illustrates the pixel unit 201 including four pixels 341 to 344. However, the pixel unit 201 includes pixels more than four.

The pixel 341 includes elements 301, 302, 303, 304, 305, and 306. The pixel 342 includes elements 311, 312, 313, 314, 315, and 316. The pixel 343 includes elements 321, 322, 323, 324, 325, and 326. The pixel 344 includes elements 331, 332, 333, 334, 335, and 336.

Each of photoelectric conversion elements 301, 311, 321, and 331 is a photodiode and generates a charge (electron) from light. A transfer switch 302 transfers the charge accumulated in the photoelectric conversion element 301 to a floating diffusion (FD) unit 303 according to a signal φTX_1. A transfer switch 312 transfers the charge accumulated in the photoelectric conversion element 311 to a FD unit 313 according to a signal φTX_2. A transfer switch 322 transfers the charge accumulated in the photoelectric conversion element 321 to a FD unit 323 according to a signal φTX_3. A transfer switch 332 transfers the charge accumulated in the photoelectric conversion element 331 to a FD unit 333 according to a signal φTX_4. The vertical scanning circuit 203 outputs the signals φTX_1 to φTX_4. The transfer switches are metal oxide semiconductor field effect transistors (MOSFETs). The vertical scanning circuit 203 controls exposure for each area and thus controls the transfer switches using a different signal if the pixel is in the different area.

The vertical scanning circuit 203 outputs signals φRST1 and φRST2 by row. A reset switch 304 resets a charge amount of the FD unit 303 according to the signal (pRST1. A reset switch 314 resets a charge amount of the FD unit 313 according to the signal φRST1. A reset switch 324 resets a charge amount of the FD unit 323 according to the signal φRST2. A reset switch 334 resets a charge amount of the FD unit 333 according to the signal φRST2. The reset switches are MOSFETs.

Amplifiers 305, 315, 325, and 335 are MOSFETs and respectively output voltages corresponding to the charge amounts accumulated in the PD units 303, 313, 323, and 333.

The vertical scanning circuit 203 outputs signals φSEL1 and φSEL2 by row. A selection switch 306 outputs the output voltage of the amplifier 305 to the CDS unit 204 via a signal line 351 according to the signal φSEL1. A selection switch 316 outputs the output voltage of the amplifier 315 to the CDS unit 204 via a signal line 352 according to the signal φSEL1. A selection switch 326 outputs the output voltage of the amplifier 325 to the CDS unit 204 via the signal line 351 according to the signal φSEL2. A selection switch 336 outputs the output voltage of the amplifier 335 to the CDS unit 204 via the signal line 352 according to the signal φSEL2. The selection switches are MOSFETs.

In a case of a general image capturing apparatus, times for accumulating charges in the photoelectric conversion elements 301, 311, 321, and 331 are all the same. Further, in the general image capturing apparatus, the transfer switches 302 and 312 in the same row are controlled by the same signal φTX_1, and the transfer switches 322 and 332 in the same row are controlled by the same signal φTX_2.

In contrast, according to the present exemplary embodiment, the transfer switches 302, 312, 322, and 332 uses the different signals φTX_1 to φTX_4 for each area. Accordingly, the charge accumulation times of the photoelectric conversion elements 301, 311, 321, and 331 can be changed for each area. For example, the pixels 341, 342, 343, and 344 can exist in respective different areas and can be set to respective different charge accumulation times.

Figure 4:
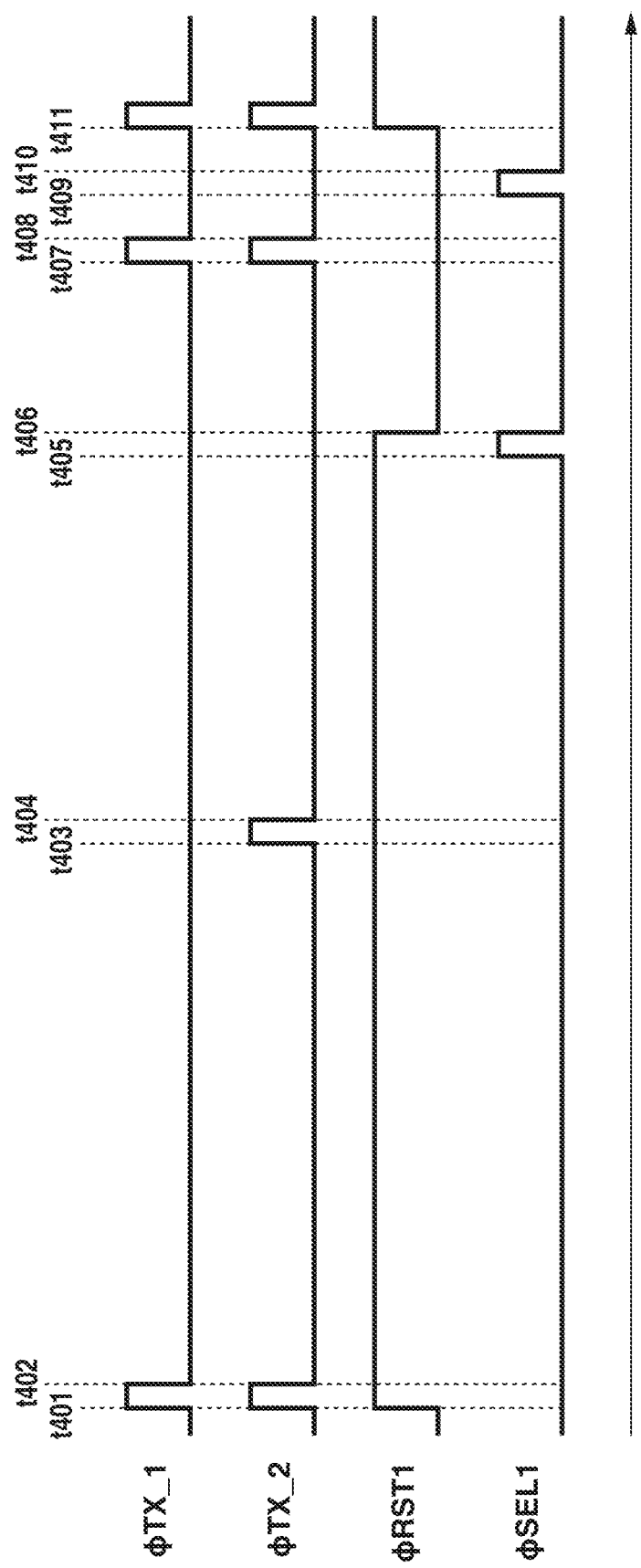
FIG. 4 is a timing chart illustrating a driving sequence of the pixel unit.

A timing chart indicating driving sequences of the pixels 341 and 342 is described with reference to FIG. 4. At a time t401, the transfer signals φTX_1 and φTX_2 and a reset signal φRST shift from a low level to a high level. Accordingly, the photoelectric conversion elements 301 and 311 are each brought into a reset state.

At a time t402, the transfer signals φTX_1 and φTX_2 shift from the high level to the low level. Accordingly, the photoelectric conversion elements 301 and 311 start charge accumulation.

At a time t403, the transfer signal φTX_2 shifts from the low level to the high level. Accordingly, the photoelectric conversion element 311 is brought into the reset state.

At a time t404, the transfer signal φTX_2 shifts from the high level to the low level. Accordingly, the photoelectric conversion element 311 starts the charge accumulation again. By changing timings of the times t403 and t404, the pixel 342 can freely change the charge accumulation time independently of the pixel 341. The pixel 341 can set the charge accumulation time in a similar way, but the charge accumulation time is set to a maximum value in FIG. 4.

At a time t405, the signal φSEL1 shifts from the low level to the high level. Accordingly, the selection switches 306 and 316 respectively transfer the reset levels to the CDS unit 204.

At a time t406, the signals φRST1 and φSEL1 shift from the high level to the low level.

At a time t407, the transfer signals φTX_1 and φTX_2 shift from the low level to the high level. Accordingly, the transfer switch 302 transfers the charge of the photoelectric conversion element 301 to the FD unit 303, and the transfer switch 312 transfers the charge of the photoelectric conversion element 311 to the FD unit 313.

At a time t408, the transfer signals φTX_1 and φTX_2 shift from the high level to the low level.

At a time t409, the signal φSEL1 shifts from the low level to the high level. Accordingly, the selection switches 306 and 316 respectively transfer pixel signals based on the charge amounts of the PD units 303 and 313 to the CDS unit 204. The CDS unit 204 outputs, as a final pixel signal, a value obtained by subtracting a signal of the reset level transferred at the time t406 from the pixel signal transferred at the time t409.

At a time t410, the signal φSEL1 shifts from the high level to the low level. After a time t411, the driving sequences from the time t401 to the time t410 are repeated again.

The image capturing unit 101 is driven by a rolling shutter operation and sequentially reads the pixel signal of each row by row. In other words, the pixels 343 and 344 are read according to a similar timing chart at a timing delayed from that of the pixels 341 and 342.

A flow of increasing and decreasing the number of areas is described with reference to FIG. 5. In step S501, the area increase/decrease unit 103 determines whether the number of divisions of a current area of the pixel unit 201 is a minimum. The minimum value is determined based on a structure of the image capturing apparatus 100, and as the minimum number of divisions is greater, a circuit of the image capturing apparatus 100 is more complicated. In a case where the area increase/decrease unit 103 determines that the number of divisions is not the minimum (NO in step S501), the processing proceeds to step S502, whereas in a case where the area increase/decrease unit 103 determines that the number of divisions is the minimum (YES in step S501), the processing proceeds to step S505.

In step S502, the area increase/decrease unit 103 simulatively generates an image in a case where the number of divisions of the area of the pixel unit 201 is decreased using a digital gain, and calculates a total number of pixels at a saturation level and a black level of the image. The processing in step S502 is described in detail with reference to FIG. 7.

In step S503, in a case where the total number of pixels at the saturation level and the black level is a threshold value η1 or less (YES in step S503), the area increase/decrease unit 103 advances the processing to step S504. In a case where the total number of pixels at the saturation level and the black level is not the threshold value η1 or less (NO in step S503), the area increase/decrease unit 103 advances the processing to S505.

Figure 5:
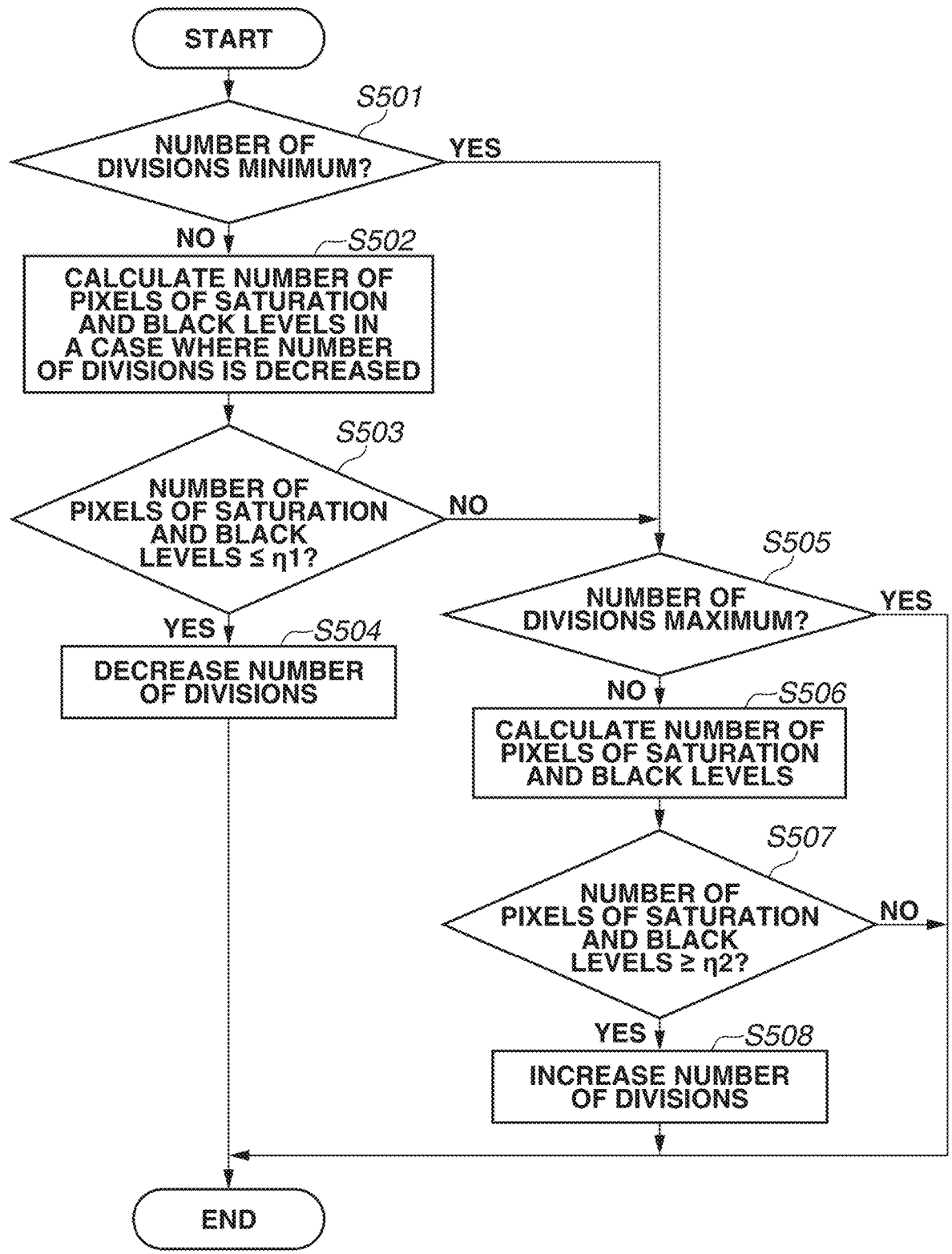
FIG. 5 is a flowchart illustrating processing for increasing and decreasing the number of divisions of an area.

In step S504, the area increase/decrease unit 103 decreases the number of divisions of the area of the pixel unit 201 and ends the processing in FIG. 5.

In step S505, the area increase/decrease unit 103 determines whether the number of divisions of the current area of the pixel unit 201 is a maximum. The maximum value can be the total number of pixels or can be freely set by a user of a device equipped with the image capturing apparatus 100. In a case where the area increase/decrease unit 103 determines that the number of divisions is not the maximum (NO in step S505), the processing proceeds to step S506. In a case where the area increase/decrease unit 103 determines that the number of divisions is the maximum (YES in step S505), the area increase/decrease unit 103 ends the processing in FIG. 5.

In step S506, the area increase/decrease unit 103 calculates the total number of pixels at the saturation level and the black level of an entire image of the image capturing unit 101.

In step S507, in a case where the total number of pixels at the saturation level and the black level of the entire image of the image capturing unit 101 is a threshold value η2 or more (YES in step S507), the area increase/decrease unit 103 advances the processing to step S508. In a case where the total number of pixels at the saturation level and the black level of the entire image of the image capturing unit 101 is not the threshold value η2 or more (NO in step S507), the area increase/decrease unit 103 ends the processing in FIG. 5.

In step S508, the area increase/decrease unit 103 increases the number of divisions of the area of the pixel unit 201 and ends the processing in FIG. 5.

An example of increasing the number of divisions of the area is described with reference to FIG. 6. An image 601 is output from the image capturing unit 101 before the number of divisions of the area is increased in step S508 and is divided into 4 areas. An image 602 is output from the image capturing unit 101 after the number of divisions of the area is increased in step S508 and is divided into 16 areas. A histogram 603 is a histogram of the entire image 601. The area increase/decrease unit 103 calculates the total number of pixels at the saturation level and the black level from the histogram 603. A histogram 604 is a histogram of the entire image 602, and the total number of pixels at the saturation level and the black level is decreased by increasing the number of divisions. The area increase/decrease unit 103 changes the number of areas from 4 to 16 in a case where the total number of pixels at the saturation level and the black level is the threshold value η2 or more based on the histogram 603. Accordingly, the total number of pixels at the saturation level and the black level is decreased in the entire image, and a dynamic range is expanded.

An example of decreasing the number of divisions of the area is described with reference to FIG. 7. An image 701 is output from the image capturing unit 101 before the number of divisions of the area is decreased in step S504 and is divided into 4 areas. An image 702 is an image obtained by applying digital gains to the image 701. The digital gain of 2 times is applied to upper left and lower left areas of the image 701, and the digital gain of 0.5 times is applied to upper right and lower right areas of the image 701. A histogram 703 is a histogram of the entire image 702. An image 704 is output from the image capturing unit 101 after the number of divisions of the area is decreased in step S504 and includes one area. A histogram 705 is a histogram of the image 704. A digital gain value of the image 702 is controlled so that an average value of the histogram 703 becomes an intermediate value of the pixels (2048 in FIG. 7) as exposure of the entire image. Processing for virtually generating the image 702 using the digital gain value is performed in examples illustrated in FIGS. 9 and 12, but descriptions thereof are omitted. The total number of pixels at the saturation level and the black level is increased in the entire image by the control described according to FIG. 7.

However, if the threshold value 111 is set so that a sufficient dynamic range can be secured, an influence on the image is small.

Figure 8:
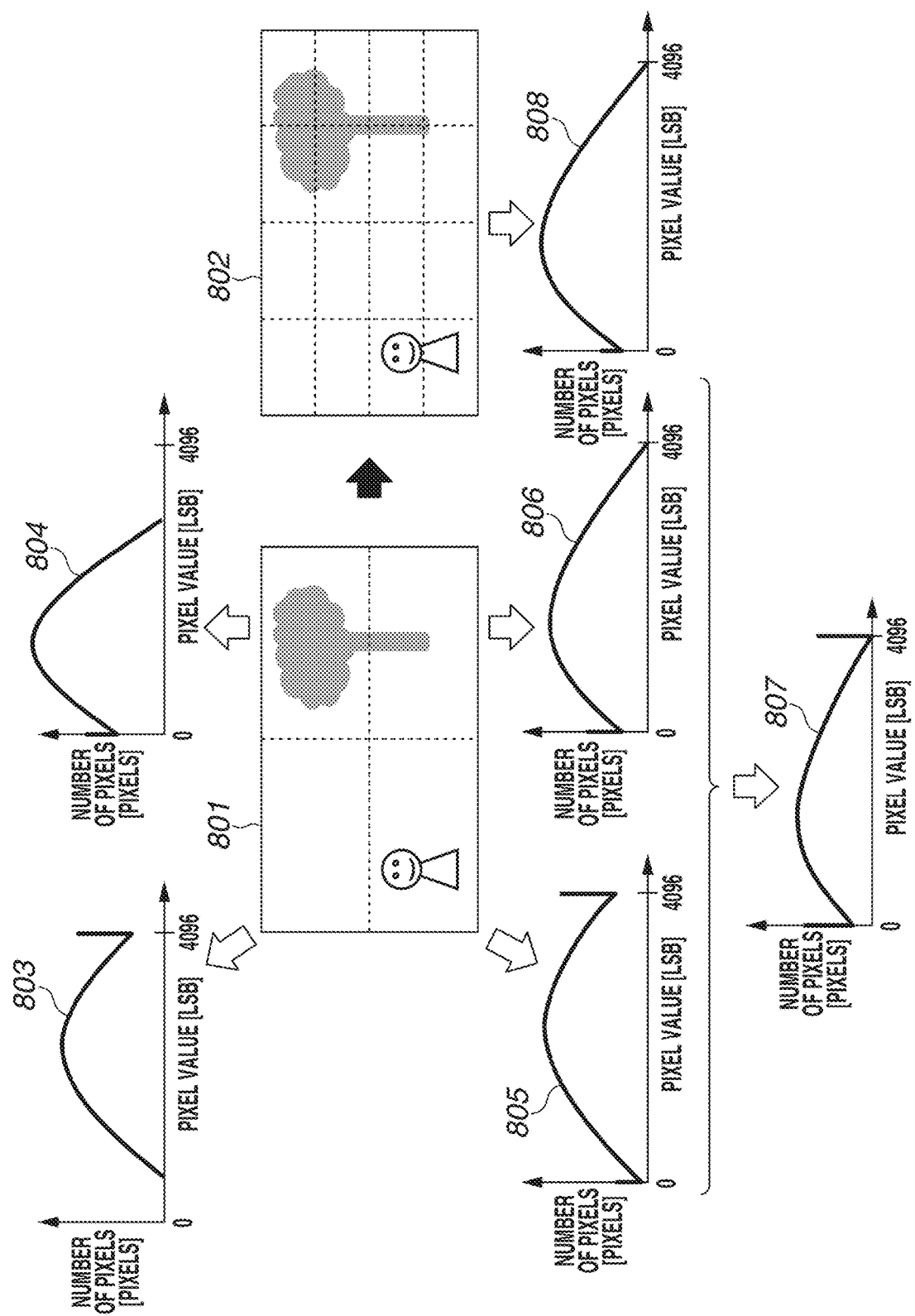
FIG. 8 illustrates an example of increasing the number of divisions.

An example of increasing the number of divisions by calculating the total number of pixels at the saturation level and the black level for each area of the pixel unit 201 is described with reference to FIG. 8. In FIG. 8, a method for calculating the total number of pixels at the saturation level and the black level in step S506 and a method for determining whether to increase the number of divisions in step S507 are different from the methods in FIG. 6. An image 801 is output from the image capturing unit 101 before the number of divisions of the area is increased in step S508 and is divided into 4 areas. An image 802 is output from the image capturing unit 101 after the number of divisions of the area is increased in step S508 and is divided into 16 areas. Histograms 803, 804, 805, and 806 are respective histograms of upper left, upper right, lower left, and lower right areas in the image 801. A histogram 807 is a histogram of the entire image 801. A histogram 808 is a histogram of the entire image 802. The area increase/decrease unit 103 calculates the total number of pixels at the saturation level and the black level for each of the upper left, upper right, lower left, and lower right areas in the image 801 using the histograms 803, 804, 805, and 806 and calculates the number of areas of which the total number of pixels exceeds a threshold value $\eta 3$. In a case where the number of areas of which the total number of pixels exceeds the threshold value $\eta 3$ is a threshold value $\theta 1$ or more, the area increase/decrease unit 103 increases the number of divisions of the area and increases the number of areas from 4 to 16. In the example in FIG. 8, it is easier to determine whether to increase the number of areas with respect to local pixels at the saturation level and the local black level (for example, light of a light bulb) as compared with the example in FIG. 6. Therefore, in a case where the number of areas is increased, an image locally with halation or blocked-up shadows is less likely to be generated.

Figure 9:
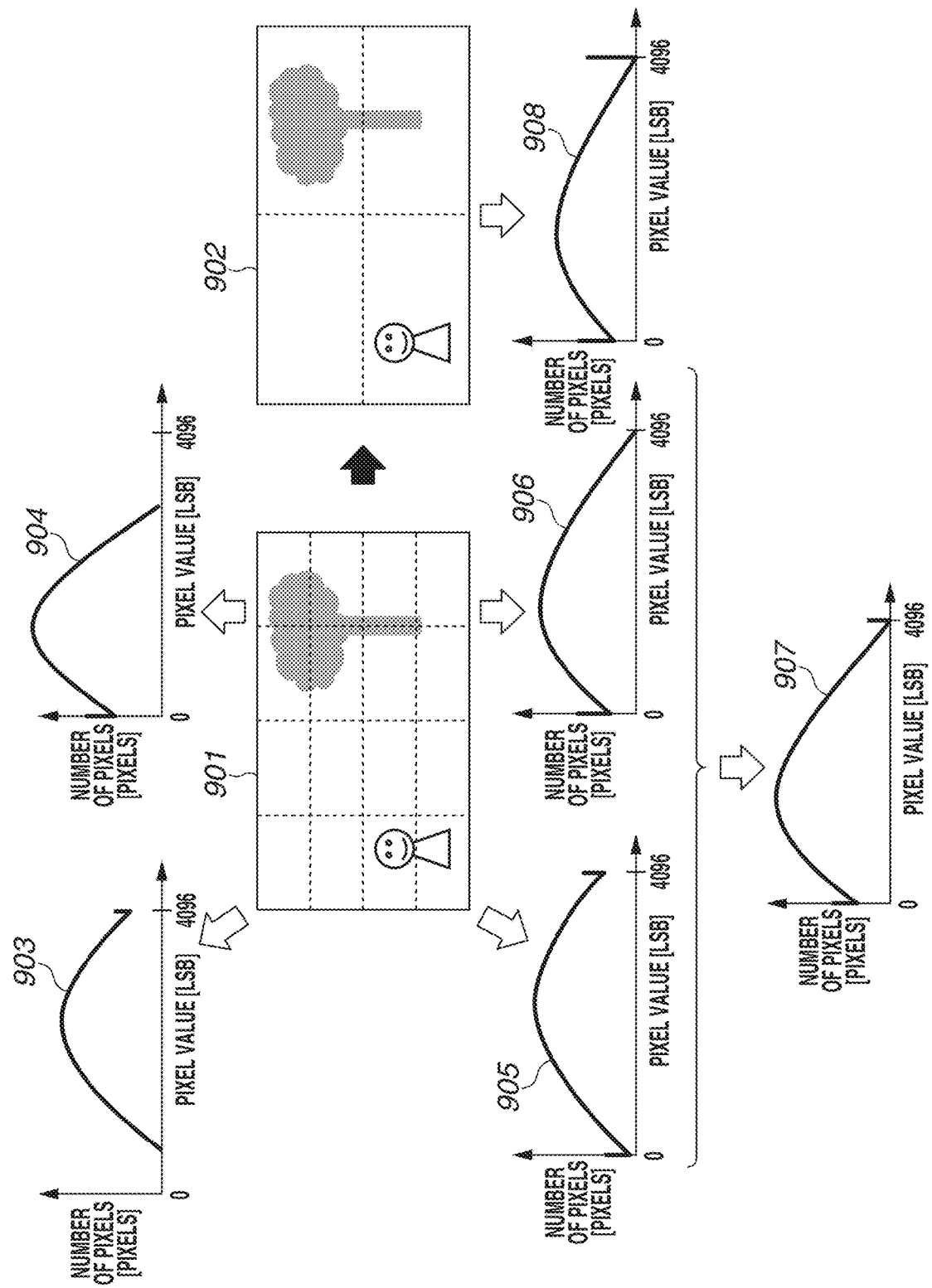
FIG. 9 illustrates an example of decreasing the number of divisions.

An example of decreasing the number of divisions by calculating the total number of pixels at the saturation level and the black level for each area of the pixel unit 201 is described with reference to FIG. 9. In FIG. 9, the method for calculating the total number of pixels at the saturation level and the black level in step S502 and the method for determining whether to decrease the number of divisions in step S503 are different from the methods in FIG. 7. An image 901 is output from the image capturing unit 101 before the number of divisions of the area is decreased in step S504 and is divided into 16 areas. An image 902 is output from the image capturing unit 101 after the number of divisions of the area is decreased in step S504 and is divided into 4 areas. Histograms 903, 904, 905, and 906 are respective histograms of upper left, upper right, lower left, and lower right areas in the image 901 in a case where the number of divisions of the area is decreased to 4. The area increase/decrease unit 103 generates a virtual image obtained in a case where the number of divisions of the area in the image 901 is decreased to 4 by applying a digital gain or the like to the entire image 901 and calculates the histograms 903, 904, 905, and 906 from the virtual image. A histogram 907 is a histogram of the entire image 901. A histogram 908 is a histogram of the entire image 902. The area increase/decrease unit 103 calculates the total number of pixels at the saturation level and the black level for each of the upper left, upper right, lower left, and lower right areas in the virtual image using the histograms 903, 904, 905, and 906 and calculates the number of areas of which the total number of pixels exceeds a threshold value $\eta 4$. In a case where the number of areas of which the total number of pixels exceeds the threshold value $\eta 4$ is a threshold value $\theta 2$ or less, the area increase/decrease unit 103 decreases the number of divisions of the area and decreases the number of areas from 16 to 4. The example in FIG. 9 can prevent decrease of the number of areas in a case where there are local pixels at the saturation level and the black level, as compared with the method in FIG. 7. Therefore, in a case where the number of areas is decreased, an image locally with halation or blocked-up shadows is less likely to be generated.

An example of decreasing the number of divisions by calculating a ratio of a maximum value and a minimum value of the charge accumulation time for each area according to a second exemplary embodiment is described with reference to FIG. 10. According to the second exemplary embodiment, the area increase/decrease unit 103 determines whether to decrease the number of divisions based on not the number of pixels at the saturation level and the black level but the ratio of the maximum value and the minimum value of the charge accumulation time. As to a method for increasing the number of divisions, the same method as in the first exemplary embodiment is used.

Figure 7:
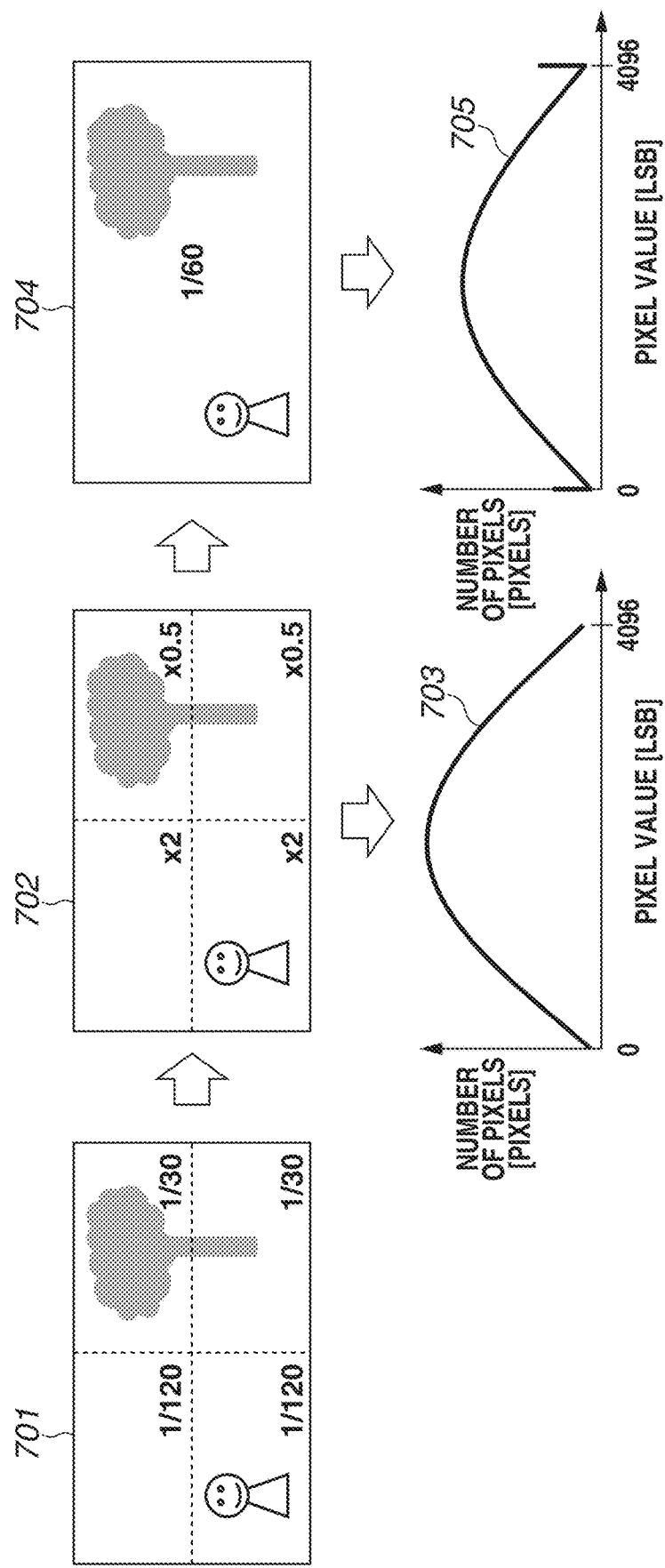
FIG. 7 illustrates an example of decreasing the number of divisions of an area.
Figure 10:
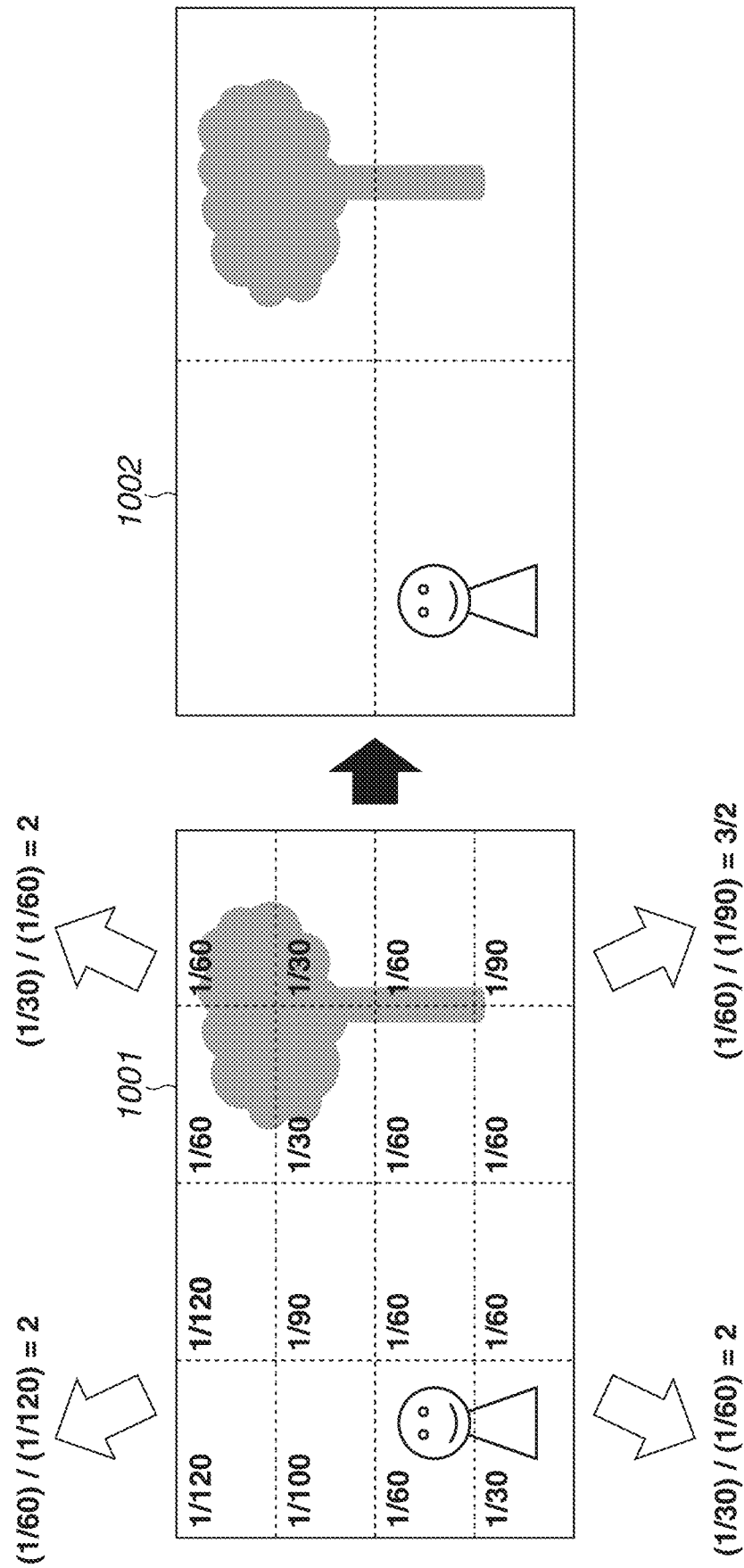
FIG. 10 illustrates an example of decreasing the number of divisions.

In FIG. 10, whether to decrease the number of divisions in step S503 is determined not by the total number of pixels at the saturation level and the black level in step S502 as in the case illustrated in FIG. 7 but by the ratio of the maximum value and the minimum value of the charge accumulation time. The charge accumulation time is calculated by the exposure amount determination unit 104 using a value of one previous frame and is determined so that an average value of histograms calculated by the histogram calculation unit 102 is to be an intermediate value of the pixels (2048 in FIG. 10). An image 1001 is output from the image capturing unit 101 before the number of divisions of the area is decreased in step S504 and is divided into 16 areas. An image 1002 is output from the image capturing unit 101 after the number of divisions of the area is decreased in step S504 and is divided into 4 areas. The area increase/decrease unit 103 calculates a ratio of the maximum value and the minimum value of the charge accumulation time of the photoelectric conversion elements of each area in a case where the number of divisions of the area in the image 1001 is decreased. In a case where a maximum value of the ratio of the maximum value and the minimum value of the charge accumulation time of each area is the threshold value $\theta 2$ or less, the area increase/decrease unit 103 decreases the number of divisions of the area and decreases the number of areas from 16 to 4. The method in FIG. 10 does not require calculation of pixels at the saturation level and the black level and thus can determine whether to decrease the number of divisions by a small amount of calculation, as compared with the method in FIG. 9.

An example of increasing the number of divisions of the area of which the total number of pixels at the saturation level and the black level is large for each area according to a third exemplary embodiment is described with reference to FIG. 11. According to the third exemplary embodiment, the number of divisions of the area is increased or decreased not in the entire image but in a part of the image.

Figure 6:
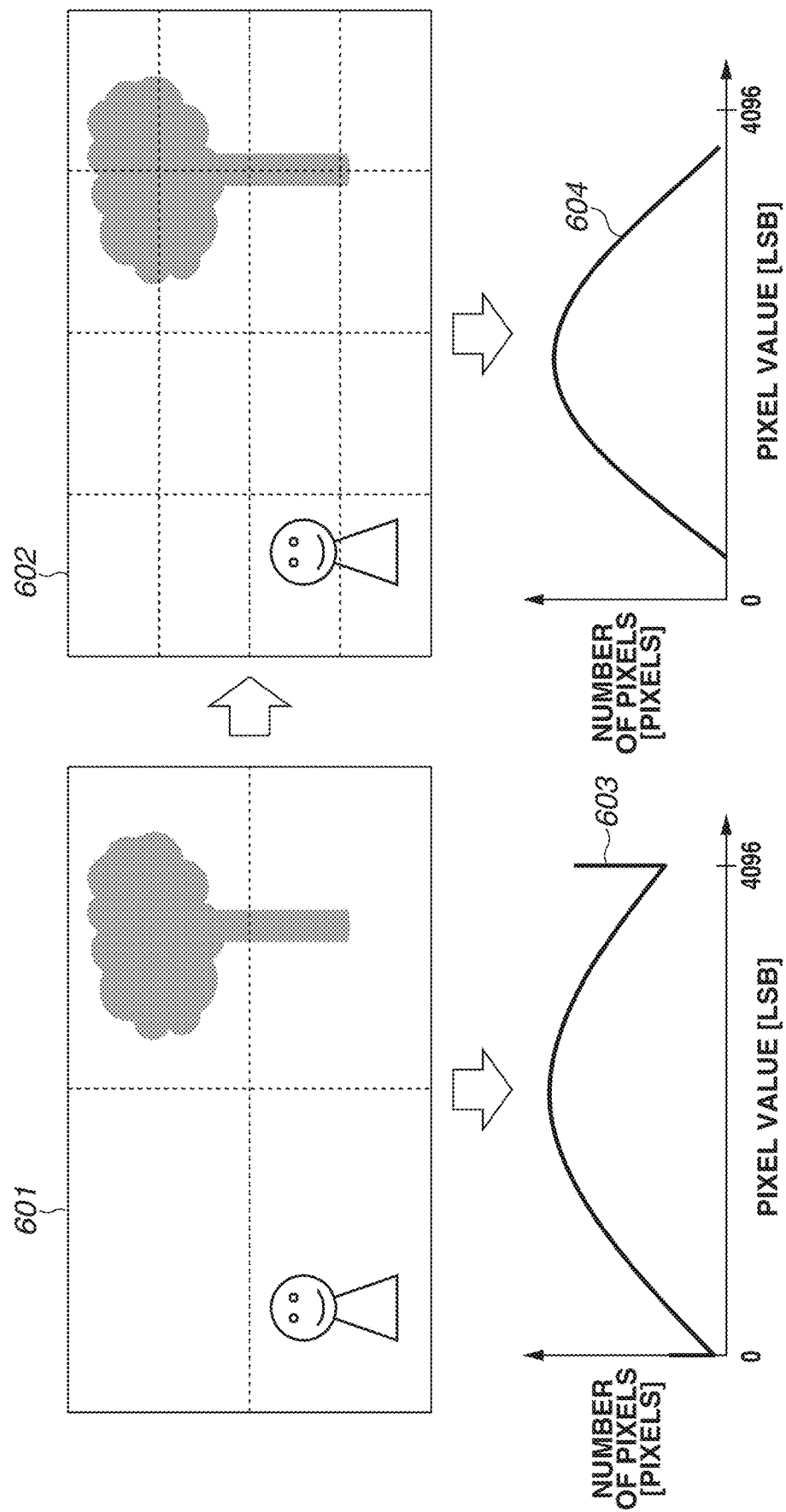
FIG. 6 illustrates an example of increasing the number of divisions of an area.
Figure 11:
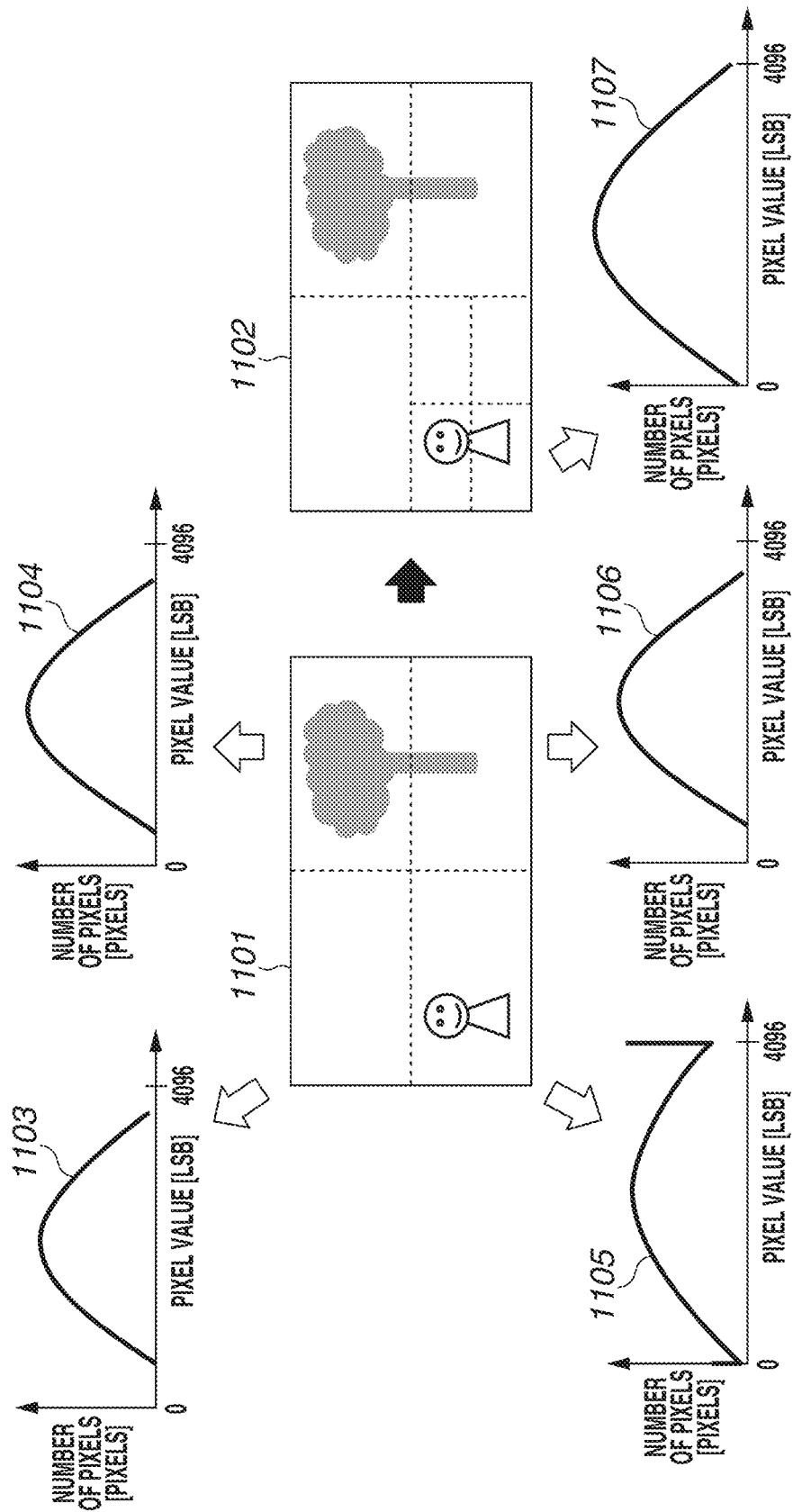
FIG. 11 illustrates an example of increasing the number of divisions.

In FIG. 11, the method for calculating the total number of pixels at the saturation level and the black level in step S506 and the method for determining whether to increase the number of divisions in step S507 are different from the methods in FIG. 6. In FIG. 11, the number of divisions is increased not in the entire image as in the case illustrated in FIG. 6 but only in the area in which the number of divisions needs to be increased.

An image 1101 is output from the image capturing unit 101 before the number of divisions of the area is increased in step S508 and is divided into 4 areas. An image 1102 is output from the image capturing unit 101 after the number of divisions of the area is increased in step S508 and is divided into 7 areas. Histograms 1103, 1104, 1105, and 1106 are respective histograms of upper left, upper right, lower left, and lower right areas in the image 1101. A histogram 1107 is a histogram of four lower left areas in the image 1102. The area increase/decrease unit 103 calculates the total number of pixels at the saturation level and the black level for each of the upper left, upper right, lower left, and lower right areas in the image 1101 using the histograms 1103, 1104, 1105, and 1106. The area increase/decrease unit 103 increases the number of divisions of the area of which the total number of pixels at the saturation level and the black level exceeds a threshold value η5.

In FIG. 11, the total number of pixels at the saturation level and the black level calculated from the histogram 1105 exceeds the threshold value η5, so that the area increase/decrease unit 103 increases the number of divisions of the lower left area in the image 1101 to 4. As a result, the number of divisions is as illustrated in the image 1102. Accordingly, as the histogram 1105 is compared with the histogram 1107, the total number of pixels at the saturation level and the black level in the histogram 1107 is decreased, and an image having a wide dynamic range can be obtained. In FIG. 11, the number of divisions is increased only in the area which needs to be divided as compared with FIG. 8 in which the number of divisions is increased or decreased in the entire image. Therefore, boundary portions of areas are decreased, and an unnatural level difference is reduced. Further, a calculation amount of the histogram calculation unit 102 is reduced, so that it is advantageous in terms of reducing power consumption.

Figure 12:
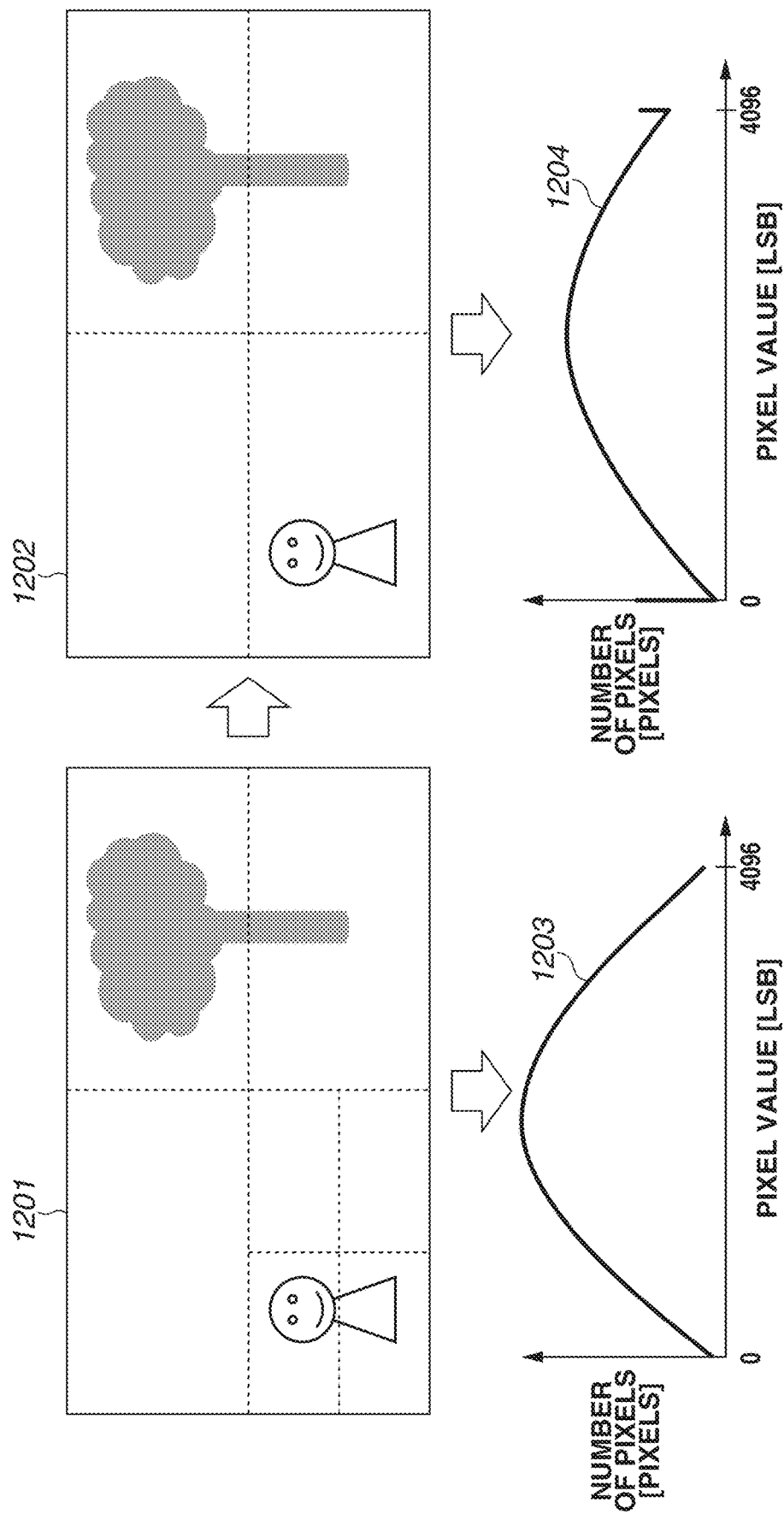
FIG. 12 illustrates an example of decreasing the number of divisions.

An example of decreasing the number of divisions by calculating the total number of pixels at the saturation level and the black level in the area of which the number of divisions is large according to the third exemplary embodiment is described with reference to FIG. 12. In FIG. 12, the method for calculating the total number of pixels at the saturation level and the black level in step S502 and the method for determining whether to decrease the number of divisions in step S503 are different from the methods in FIG. 7. In FIG. 12, the number of divisions is decreased not in the entire image as in the case illustrated in FIG. 7 but only in the area in which the number of divisions needs to be decreased.

An image 1201 is output from the image capturing unit 101 before the number of divisions of the area is decreased in step S504 and is divided into 7 areas in which the number of divisions in the lower left area is particularly large. An image 1202 is output from the image capturing unit 101 after the number of divisions of the area is decreased in step S504 and is divided into 4 areas. A histogram 1203 is a histogram calculated from an area obtained in a case where the number of divisions of the lower left area (a part of the area) in the image 1201 is decreased from four to one. The area increase/decrease unit 103 generates a virtual image obtained in a case where the number of divisions of the lower left area in the image 1201 is decreased from four to one by applying a digital gain or the like to the image 1201 and calculates the histogram 1203 from the lower left area in the virtual image. A histogram 1204 is a histogram of the lower left area in the image 1202. The area increase/decrease unit 103 calculates the total number of pixels at the saturation level and the black level from the histogram 1203 and determines whether the total number of pixels is a threshold value η6 or less. In a case where the total number of pixels is the threshold value η6 or less, the area increase/decrease unit 103 decreases the number of divisions of the area from which the histogram 1203 is calculated, so that the number of divisions is as illustrated in the image 1202. In the histogram 1204, the number of pixels at the saturation level and the black level is increased as compared with the histogram 1203. However, the boundary portions of the areas are decreased, and the unnatural level difference is reduced.

Figure 13:
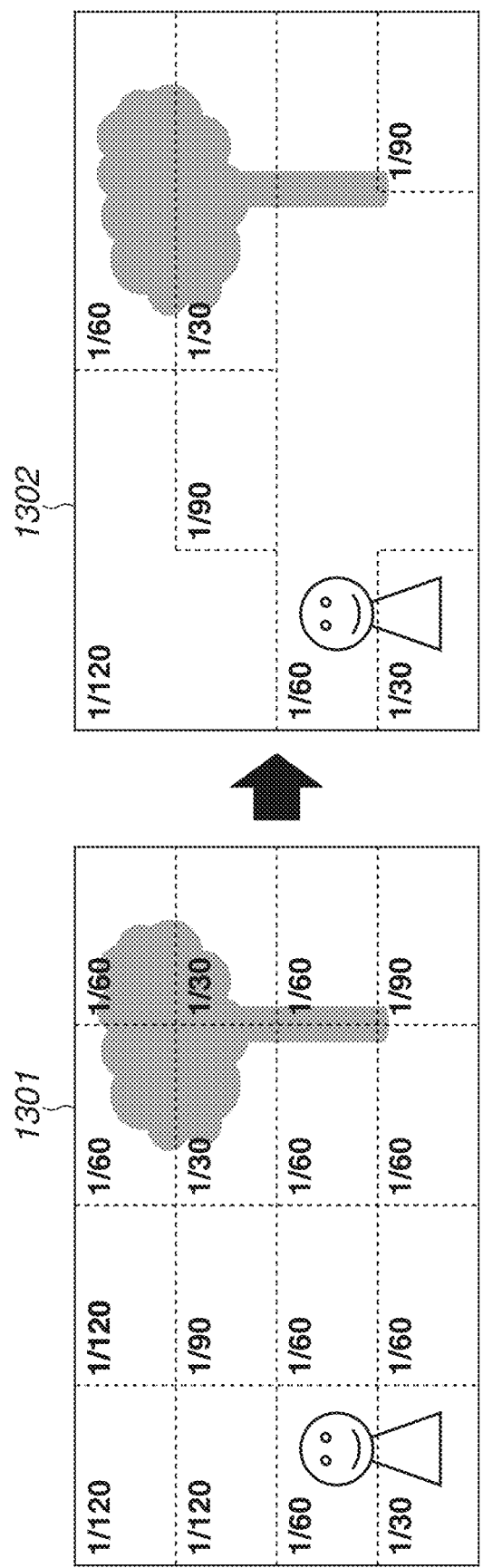
FIG. 13 illustrates an example of decreasing the number of divisions.

An example of decreasing the number of divisions by combining adjacent areas with each other in a case where the charge accumulation times of the adjacent areas are the same according to the third exemplary embodiment is described with reference to FIG. 13. In FIG. 13, calculation of the number of pixels at the saturation level and the black level in step S502 and determination in step S503 are not necessary, and, in a case where the charge accumulation times of the adjacent areas are the same in step S504, the number of divisions is decreased by combining the adjacent areas with each other.

An image 1301 is output from the image capturing unit 101 before the number of divisions of the area is decreased in step S504 and is divided into 16 areas. An image 1302 is output from the image capturing unit 101 after the number of divisions of the area is decreased in step S504 and is divided into 7 areas. In a case where the charge accumulation times of the photoelectric conversion elements in the adjacent areas in the image 1301 are the same, the area increase/decrease unit 103 combines the adjacent areas to be the same area and thus decreases the number of divisions of the area. Accordingly, the number of divisions is as illustrated in the image 1302. According to the method in FIG. 13, the boundary portions of the areas are decreased, and the unnatural level difference is reduced as compared with the method in FIG. 12. Further, the calculation amount of the histogram calculation unit 102 is reduced, so that it is advantageous in terms of reducing power consumption.

The image capturing apparatus 100 can be applied to a smartphone, a tablet terminal, an industrial camera, a medical camera, an onboard camera, or the like in addition to a digital camera or a video camera.

The exemplary embodiments described above are merely examples for implementing the present invention, so that the examples should not be construed restrictively limiting the technical scope of the present invention. In other words, the present invention can be implemented in the various forms without departing from the technical idea and/or the main features thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-207912, filed Nov. 18, 2019, which is hereby incorporated by reference herein in its entirety.

What is claimed is:

1. An image capturing apparatus comprising:
an image sensor; and
one or more processors executing instructions that, when executed by the one or more processors, cause the one or more processors to:
set as a first setting, a first plurality of areas on an imaging surface of the image sensor in which each area of the first plurality of areas comprises one or more pixels;
set a charge accumulation time for each area of the first plurality of areas, a different charge accumulation time being settable for the first plurality of areas;
calculate a histogram of a pixel value for the first plurality of areas set in the first setting;
determine whether to perform a second setting, which is different from the first setting, to set a second plurality of areas on the imaging surface, based on the calculated histogram;
set, as the second setting, the second plurality of areas by changing a number of the first plurality of areas, in a case where the second setting is determined to be performed; and
determine a charge accumulation time the for each area of the second plurality of areas, wherein a different charge accumulation time is settable for any of the second plurality of areas.

2. The image capturing apparatus according to claim 1, wherein the instructions further cause the one or more processors to:
control the image sensor such that the image sensor captures an image of an object at the charge accumulation time determined for the each area on the imaging surface of the image sensor.

3. The image capturing apparatus according to claim 1, wherein the instructions further cause the one or more processors to:
adjust a gain of the pixel value of the each area based on the charge accumulation time of the each area.

4. The image capturing apparatus according to claim 1, wherein the instructions further cause the one or more processors to:
determine whether to set the second plurality of areas on the imaging surface, based on a total number of pixels with a saturation level and a black level in the calculated histogram.

5. The image capturing apparatus according to claim 1, wherein the instructions further cause the one or more processors to:
determine to decrease the number of the first plurality of areas on the imaging surface in a case where a total number of pixels with a saturation level and a black level is a first threshold value or less in the calculated histogram;
set, as the second setting, the second plurality of areas such that a number of the second plurality of areas is equal to the number of the first plurality of areas or less, in a case where the number of the first plurality of areas on the imaging surface of the image sensor is determined to be decreased.

6. The image capturing apparatus according to claim 1, wherein the instructions further cause the one or more processors to:
determine to increase the number of the first plurality of areas on the imaging surface in a case where a total number of pixels with a saturation level and a black level is a second threshold value or more in the calculated histogram;
set, as the second setting, the second plurality of areas such that a number of the second plurality of areas is equal to the number of the first plurality of areas or more, in a case where the number of the first plurality of areas on the imaging surface of the image sensor is determined to be increased.

7. The image capturing apparatus according to claim 1, wherein the instructions further cause the one or more processors to:
determine to increase the number of the first plurality of areas on the imaging surface in a case where the number of the first plurality of areas of which a total number of pixels with a saturation level and a black level exceeds a third threshold value is a fourth threshold value or more in the calculated histogram;
set, as the second setting, the second plurality of areas such that the number of the second plurality of areas is equal to the number of the first plurality of areas or more, in a case where the number of the first plurality of areas on the imaging surface of the image sensor is determined to be increased.

8. The image capturing apparatus according to claim 1, wherein the instructions further cause the one or more processors to:
determine to decrease the number of the first plurality of areas on the imaging surface in a case where the number of the first plurality of areas of which a total number of pixels with a saturation level and a black level in a case where the number of the plurality of areas is decreased exceeds a fifth threshold value is a sixth threshold value or less,
set, as the second setting, the second plurality of areas such that a number of the second plurality of areas is equal to the number of the first plurality of areas or less, in a case where the number of the first plurality of areas on the imaging surface of the image sensor is determined to be decreased.

9. The image capturing apparatus according to claim 1, wherein the instructions further cause the one or more processors to:

determine whether to set the second plurality of areas on the imaging surface, based on the charge accumulation time of the each area of the first plurality of areas.

10. The image capturing apparatus according to claim 1, wherein the instructions further cause the one or more processors to:
determine whether to decrease the number of the first plurality of areas based on a maximum value of a ratio of a maximum value and a minimum value of the charge accumulation time for the each area of the first plurality of areas.

11. The image capturing apparatus according to claim 1, wherein the instructions further cause the one or more processors to:
decrease the number of the first plurality of areas by combining two or more areas of the first plurality of areas in which the two or more areas are adjacent to each other and have the same charge accumulation time in a case where the number of the first plurality of areas on the imaging surface of the image sensor is determined to be decreased.

12. A method for controlling an image capturing apparatus including an image sensor comprising:
setting as a first setting, a first plurality of areas on an imaging surface of the image sensor in which each area of the first plurality of areas comprises one or more pixels;
setting a charge accumulation time for each area of the first plurality of areas, wherein a different charge accumulation time is settable for any of the first plurality of areas;
calculating a histogram of a pixel value for the each area of the first plurality of areas set in the first setting;
determining whether to perform a second setting, which different from the first setting, to set a second plurality of areas on the imaging surface, based on the calculated histogram;
setting the second plurality of areas by changing a number of the first plurality of areas, in a case where the second setting is determined to be performed; and
determining a charge accumulation time for each area of the second plurality of areas, wherein a different charge accumulation time is settable for any of the second plurality of areas.

13. The method according to claim 12, further comprising controlling the image sensor such that the image sensor captures an image of an object at the charge accumulation time determined for the each area on the imaging surface of the image sensor.

14. The method according to claim 12, further comprising adjusting a gain of the pixel value of the each area based on the charge accumulation time of the each area determined by the determining.

15. The method according to claim 12, further comprising determining whether to set the second plurality of areas on the imaging surface, based on a total number of pixels with a saturation level and a black level in the calculated histogram.

16. A non-transitory computer-readable medium storing a program for causing a computer to execute a method for controlling an image sensor, the method comprising:
setting as a first setting, a first plurality of areas on an imaging surface of the image sensor in which each area of the first plurality of areas comprises one or more pixels;
setting a charge accumulation time for each area of the first plurality of areas set, wherein a different charge accumulation time is settable for any of the first plurality of areas;
calculating a histogram of a pixel value for the each area of the first plurality of areas;
determining whether to perform a second setting, which is different from the first setting, to set a second plurality of areas on the imaging surface, based on the calculated histogram;
setting, as the second setting, the second plurality of areas by changing a number of the first plurality of areas, in a case where the second setting is determined to be performed; and
determining a charge accumulation time for the each area of the second plurality of areas, wherein a different charge accumulation time is settable for any of the second plurality of areas.

17. The non-transitory computer-readable medium according to claim 16, wherein the method further comprises controlling the image sensor such that the image sensor captures an image of an object at the charge accumulation time determined for the each area on the imaging surface of the image sensor.

18. The non-transitory computer-readable medium according to claim 16, wherein the method further comprises adjusting a gain of the pixel value of the each area based on the charge accumulation time of the each area.

19. The image capturing apparatus according to claim 1, wherein the instructions further cause the one or more processors to:
set one of the second plurality of areas by combining two or more areas of the first plurality of areas, the two or more areas being adjacent to each other.

20. The image capturing apparatus according to claim 1, wherein the instructions further cause the one or more processors to:
set the second plurality of areas by dividing one of the first plurality of areas.

21. The image capturing apparatus according to claim 1, wherein the instructions further cause the one or more processors to:
calculate a histogram of a pixel value for at least one of the first plurality of areas.

22. The image capturing apparatus according to claim 1, wherein the instructions further cause the one or more processors to:
calculate a histogram of a pixel value for all of the first plurality of areas.

* * * * *